United States Patent [19]

Leal

[11] Patent Number: 4,707,804

[45] Date of Patent: Nov. 17, 1987

[54] COMPUTER SECURITY SYSTEM

[76] Inventor: Luis T. Leal, 938 Noble Pl., Toledo, Ohio 43608

[21] Appl. No.: 581,894

[22] Filed: Feb. 21, 1984

[51] Int. Cl.⁴ .............................................. H04Q 1/00
[52] U.S. Cl. ............................. 340/825.32; 340/825.5; 371/57; 379/95
[58] Field of Search ...................... 340/825.32, 825.34, 340/825.5, 825.51; 364/200, 900, 184, 185; 371/14, 57; 379/1, 2, 8, 26, 32, 95, 137, 139, 188, 194; 380/33

[56] References Cited

U.S. PATENT DOCUMENTS

| | | | |
|---|---|---|---|
| 3,380,024 | 4/1968 | Watkinson | 340/825.32 |
| 3,617,706 | 11/1971 | Oberhart | 235/431 |
| 3,702,987 | 11/1972 | Twyford | 340/825.33 |
| 3,731,076 | 5/1973 | Nagata et al. | 235/380 |
| 3,740,530 | 6/1973 | Hoffer et al. | 235/380 |
| 3,778,595 | 12/1973 | Hatanaka et al. | 235/379 |
| 3,794,813 | 2/1974 | Spetz | 235/382 |
| 3,892,948 | 7/1975 | Constable | 340/825.34 |
| 3,938,091 | 2/1976 | Atalla et al. | 340/825.34 |
| 3,949,364 | 4/1976 | Clark et al. | 340/825.34 |
| 3,956,618 | 5/1976 | Gotz | 364/559 |
| 3,984,637 | 10/1976 | Caudill et al. | 379/93 |
| 3,985,998 | 10/1976 | Crafton | 235/380 |
| 4,013,894 | 3/1977 | Foote et al. | 250/569 |
| 4,045,774 | 8/1977 | Morrison | 340/825.5 |
| 4,055,746 | 10/1977 | Peterson | 235/380 |
| 4,055,835 | 10/1977 | Thornton et al. | 340/825.5 |
| 4,186,871 | 2/1980 | Anderson et al. | 380/24 |
| 4,193,061 | 3/1980 | Zoltai | 340/825.34 X |
| 4,310,720 | 1/1982 | Check, Jr. | 178/22.08 |
| 4,320,387 | 3/1982 | Powell | 340/825.34 |
| 4,481,626 | 11/1984 | Boggs et al. | 340/825.5 X |
| 4,500,990 | 2/1985 | Akashi | 340/825.5 X |
| 4,517,670 | 5/1985 | Ulug | 340/825.5 X |
| 4,604,499 | 8/1986 | Hughes | 379/95 |
| 4,626,625 | 12/1986 | Daisenberger | 379/137 |
| 4,626,845 | 12/1986 | Ley | 379/188 X |
| 4,652,990 | 3/1987 | Pailen et al. | 364/200 |

Primary Examiner—Ulysses Weldon

[57] ABSTRACT

A security system for preventing access to a computer by an unauthorized remote user is disclosed. A plurality of information transmission paths, such as telephone lines, are connected to a security computer. If a remote user provides an authorized access code to the security computer over one of the telephone lines, the line is connected through a switch unit to the main computer. If an unauthorized access code is provided the security computer, a signal is generated to the switch unit to disconnect all of the telephone lines from the main computer. A counter is connected to the telephone lines which generates a disconnect signal to the switch unit when the number of remote users utilizing or attempting to gain access to the main computer exceeds a predetermined maximum number. The security computer and the counter can also be connected to an alarm unit for generating an alarm indication that an unauthorized user has attempted to gain access to the main computer.

7 Claims, 1 Drawing Figure

COMPUTER SECURITY SYSTEM

BACKGROUND OF THE INVENTION

The present invention relates in general to computer security devices and in particular to a system for preventing an unauthorized remote user from gaining access to a computer.

Remote terminals for providing access to digital computers have been used for many years. Typically, conventional telephone lines have been used to connect such remote terminals to the digital computers. A telephone number or other central switching number is utilized to select the particular circuit connected to the computer. Although steps are usually taken to maintain such telephone numbers secret, the numbers are often discovered and unauthorized access to the computer becomes a reality. Despite the fact that access codes are typically programmed into the computer to prevent the use thereof unless the proper access code is initially provided, such access codes can be discovered or defeated if an unauthorized user has access to the computer. Unauthorized use of the computer renders it vulnerable to damage or misuse and can cause propriatary information stored in the computer to be disclosed to unauthorized persons.

SUMMARY OF THE INVENTION

The present invention relates to a security system for preventing an unauthorized remote user from gaining access to a computer. A plurality of information transmission paths, such as telephone lines, are connected to a security computer. If a remote user provides an authorized access code to the security computer over one of the telephone lines, the line is connected through a switch unit to the main computer. If an unauthorized access code is provided to the security computer, a signal is generated to the switch unit to disconnect all of the telephone lines from the main computer. A counter is connected to the telephone lines which generates a similar disconnect signal to the switch unit when the number of remote users utilizing or attempting to gain access to the main computer exceeds a predetermined maximum number. The security computer and the counter can also be connected to an alarm unit for generating an alarm indication that an unauthorized user has attempted to gain access to the main computer.

It is an object of the present invention to provide an improved computer security system.

It is another object of the present invention to provide a security system for preventing an unauthorized user for gaining access to a computer.

Other objects and advantages of the present invention will become apparent to those skilled in the art from the following detailed description of the preferred embodiment, when read in light of the accompanying drawing.

DETAILED DESCRIPTION OF THE PREFERRED EMBODIMENT

Figure 1:
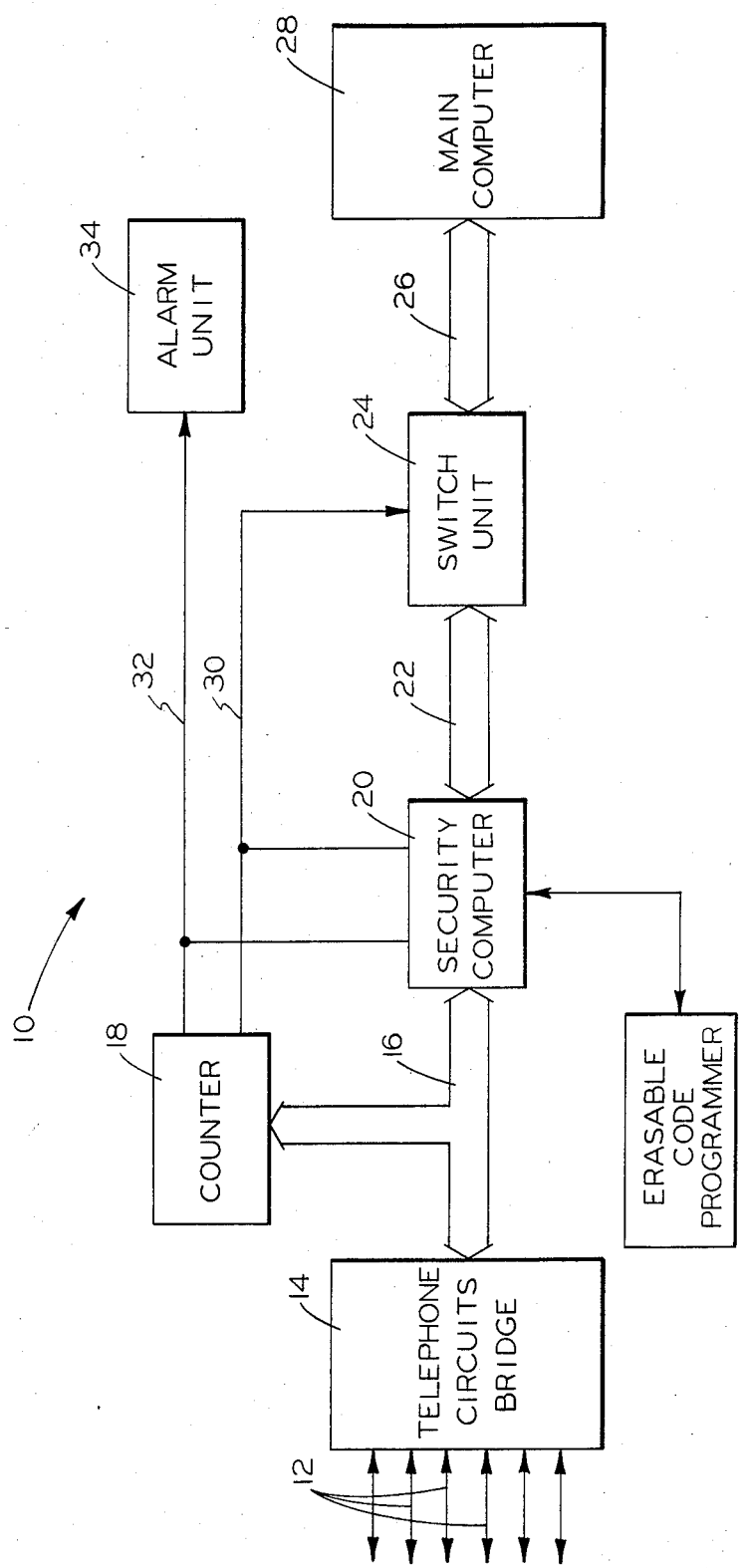
FIG. 1 is a block diagram of a computer security system in accordance with the present invention.

Referring now to FIG. 1, there is illustrated a computer security system 10 in accordance with the present invention. A plurality of digital information transmission paths 12, typically telephone lines, are connected to a telephone circuit bridge 14. The bridge 14 is provided to permit data transfer to and from each of the telephone lines 12. The bridge 14 is connected over a bus 16 to a counter 18 and a security computer 20. The security computer 20 is connected over a bus 22 to a switch unit 24. The switch unit 24 is connected over a bus 26 to a main computer 28. The counter 18 and the security computer 20 each have a first output connected over a line 30 to a control input of the switch unit 24. The counter 18 and the security computer 20 each have a second output connected over a line 32 to an alarm unit 34. If desired, an erasable code programmer 36 can be connected to the security computer 20. Each of the above-identified components of the computer security system 10 is conventional in the art.

In operation, the main computer 28 is adapted to be utilized in a known manner by a predetermined maximum number of remote users who gain access thereto by means of the telephone lines 12 which are each connected to a conventional remote terminal (not shown). The security computer 20 can be any general purpose digital computer or microprocessor. The security computer 20 is initially programmed with a set of instructions and one or more security access codes. When a remote user attempts to gain access to the main computer 28 over one of the telephone lines 12, the security computer 20 initially requests certain information from the user, such as name, location, telephone number, and the like, as well as the remote user's access code. This information, along with other information such as date and time, is stored in the memory of the security computer 20. Such information may be helpful in determining the identity of an unauthorized remote user at a later date.

When an authorized user provides the appropriate access code on one of the telephone lines 12, the security computer 20 is responsive thereto in a known manner and connects that line 12 on the bus 16 to the bus 22. The switch unit 24 is normally closed such that all of the lines on the bus 22 are connected to the lines on the bus 26 and, thus, to the main computer 28. When the authorized user has completed his use of the main computer 28, he signs off in a known manner and discontinues his use of the telephone line 12. However, prior to signing off, the authorized user can utilize the erasable code programmer 36 to change his authorized access code. The erasable code programmer 36 thus provides an extra measure of security, since the access codes are controlled by the individual authorized users. Therefore, even if an unauthorized user has discovered or otherwise obtained an authorized access code, such code will only be valid until the authorized user changes it to another code.

When a remote user provides an incorrect access code, the security computer 20 is programmed to generate a signal on the line 30 to the control input of the switch unit 24. In response thereto, the switch unit 24 is opened, thereby disconnecting all of the lines in the bus 22 from the bus 26. The switch unit 24 remains in this opened condition until it is reset by an authorized operator or by any other appropriate means. Simultaneously, the security computer 20 generates a signal on the line 32 to the alarm unit 34. The alarm unit 34 generates an alarm indication which alerts appropriate supervisory personnel that an unauthorized user has attempted to gain access to the main computer 28 and that the switch unit 24 needs to be reset. The security computer 20 can also be programmed to automatically erase all of the authorized access codes stored therein so as to prevent any user from gaining access to the main computer 28 until new access codes are provided to each of the authorized remote users.

The counter 18 is adapted to count the number of remote users currently utilizing or attempting to gain access to the main computer 28 by monitoring the number of lines on the bus 16 in use. When the number of such users or attempted users exceeds a predetermined maximum number, the counter 18 generates disconnect signals on the lines 30 and 32 similar to those described above to the switch unit 24 and the alarm unit 34, respectively, thereby disconnecting all of the telephone lines 12 from the main computer 28 and alerting the appropriate personnel. Thus, it will be appreciated that the present invention provides an additional level of security, in that an unauthorized user who has improperly obtained a security access code can still be prevented from gaining or continuing to have access to the main computer 28 if the predetermined maximum number of authorized users of the system is exceeded by the number of actual users.

The counter 18 can, if desired, be incorporated into the input or output stages of the security computer. Alternatively, the counter 18 can be connected to either of the other bus lines 22 and 26, the switch unit 24, or the main computer 28. Finally, the function of the counter 18 can be programmed into the set of operating instructions of the security computer 20 so that the hardware comprising the counter 18 can be eliminated.

It will be appreciated that the present invention can easily be installed and utilized in virtually any existing computer system. As mentioned above, each of the individual components of the computer security system 10 is conventional in the art and easily obtainable. The security computer 20 and its related components can quickly be installed by any skilled technician at a reasonable cost.

In accordance with the provisions of the patent statutes, the principle and mode of operation of the present invention have been explained and illustrated in its preferred embodiment. However, it must be appreciated that the present invention can be practiced otherwise than as specifically explained and illustrated without departing from its spirit or scope.

What is claimed is:

1. A security system for preventing an unauthorized user from gaining access to a main computer over one of a plurality of information transmission paths comprising:
    means connected to said information transmission paths for generating a signal when the number of said paths being utilized by remote users exceeds a predetermined maximum number; and
    switch means for normally connecting all of said information transmission paths to said main computer, said switch means being responsive to said signal for disconnecting all of said information transmission paths from said main computer.

2. The invention defined in claim 1 wherein said means connected to said information transmission paths includes means for counting the number of said paths being utilized by remote users.

3. A security system for preventing an unauthorized user from gaining access to a main computer utilizing an unauthorized access code over one of a plurality of information transmission paths comprising:
    means connected to said information transmission paths for generating a signal when the number of said paths being utilized by remote users exceeds a predetermined maximum number;
    security computer means connected to said information transmission paths and responsive to information carried thereon for generating a signal when an unauthorized access code is provided by a remote user over one of said paths; and
    switch means for normally connecting all of said information transmission paths to said main computer, said switch means being responsive to one of said counter means signal and said security computer means signal for disconnecting all of said information transmission paths from said main computer.

4. The invention defined in claim 3 wherein said means connected to said information transmission paths includes a counter.

5. The invention defined in claim 4 further including an alarm unit responsive to said counter means signal and said security computer means signal for generating an alarm indication.

6. The invention defined in claim 3 further including erasable code programmer means connected to said security computer means for allowing an authorized user to change access codes.

7. In a computer system having a plurality of remote terminals adapted to communicate with a main computer over respective information transmission paths, a security system for preventing an unauthorized user from gaining access to the main computer via one of the remote terminals utilizing an unauthorized access code comprising:
    first bus means connected to the plurality of information transmission paths;
    counter means connected to said first bus means for generating a signal when the number of information transmission paths being utilized by remote users exceeds a predetermined maximum number;
    security computer means connected to said first bus means and responsive to information carried thereon for generating a signal when an unauthorized access code is provided by a remote user;
    second bus means connected to said security computer means;
    switch means for normally connecting said second bus means to the main computer, said switch means being responsive to one of said counter means signal and said security computer means signal for disconnecting said second bus means from the main computer; and
    alarm unit means responsive to said counter means signal and said security computer means signal for generating an alarm indication.

* * * * *